(12) United States Patent
Rogers

(10) Patent No.: US 10,433,685 B2
(45) Date of Patent: Oct. 8, 2019

(54) AIR POWERED VACUUM SYSTEM

(71) Applicant: Michael Rogers, Rockville Centre, NY (US)

(72) Inventor: Michael Rogers, Rockville Centre, NY (US)

(*) Notice: Subject to any disclaimer, the term of this patent is extended or adjusted under 35 U.S.C. 154(b) by 278 days.

(21) Appl. No.: 15/444,501

(22) Filed: Feb. 28, 2017

(65) Prior Publication Data

US 2018/0049611 A1   Feb. 22, 2018

Related U.S. Application Data

(60) Provisional application No. 62/494,814, filed on Aug. 22, 2016.

(51) Int. Cl.
| | |
|---|---|
| *A47L 5/16* | (2006.01) |
| *A47L 9/24* | (2006.01) |
| *B60S 1/64* | (2006.01) |
| *B60T 17/04* | (2006.01) |
| *B60T 13/46* | (2006.01) |
| *A47L 9/28* | (2006.01) |
| *A47L 9/14* | (2006.01) |
| *A47L 9/12* | (2006.01) |
| *B60T 17/00* | (2006.01) |

(52) U.S. Cl.
CPC .............. *A47L 5/16* (2013.01); *A47L 9/122* (2013.01); *A47L 9/149* (2013.01); *A47L 9/244* (2013.01); *A47L 9/248* (2013.01); *A47L 9/2857* (2013.01); *B60S 1/64* (2013.01); *B60T 13/46* (2013.01); *B60T 17/002* (2013.01); *B60T 17/04* (2013.01)

(58) Field of Classification Search
CPC . A47L 5/16; A47L 9/122; A47L 9/149; A47L 9/244; A47L 9/248; A47L 9/2857; B60S 4/64; B60T 13/46; B60T 17/002; B60T 17/04
See application file for complete search history.

(56) References Cited

U.S. PATENT DOCUMENTS

| | | | | |
|---|---|---|---|---|
| 3,384,916 A | * | 5/1968 | Hockin | ............... A47L 5/38 15/313 |
| 5,454,139 A | * | 10/1995 | Beck | ............... A47L 5/18 15/313 |
| 6,148,472 A | * | 11/2000 | Arena | ............... A47L 9/108 15/313 |

(Continued)

*Primary Examiner* — Dung Van Nguyen
(74) *Attorney, Agent, or Firm* — Michael L. Greenberg, Esq.; Greenberg & Lieberman, LLC

(57) ABSTRACT

A pressurized air vacuum cleaning device that is useful for the purpose of cleaning the inside cabin of a motorized vehicle is exhibited. The power source for the suction of the vacuum is derived from the onboard pressurized air that is commonly available on motorized vehicles such as trucks and work vehicles. A vacuum chamber is disposed in communication with the pressurized air system of the vehicle, which channels pressurized air by a venturi to create useful vacuum suction from the existing flow of air. The suction is channeled to the cabin of the vehicle, within a front pipe disposed under the floor of the cabin, which houses a vacuum hose for use by a user to clean debris from the cabin. The hose is concealed beneath a cover plate on the floor, which is lifted up by the user, simultaneously activating the suction to the vacuum hose upon lifting.

7 Claims, 6 Drawing Sheets

(56) References Cited

U.S. PATENT DOCUMENTS

| | | | | |
|---|---|---|---|---|
| 2004/0107528 A1* | 6/2004 | LeClear | ........................ | A47L 5/38 15/313 |
| 2004/0134013 A1* | 7/2004 | Slone | ........................ | B60S 1/64 15/313 |
| 2004/0154122 A1* | 8/2004 | Xu | ........................ | B60S 1/64 15/313 |
| 2007/0186956 A1* | 8/2007 | Schlueter | ........................ | B60S 1/64 134/8 |
| 2009/0001001 A1* | 1/2009 | Martin | ........................ | B60S 1/603 210/130 |
| 2010/0043168 A1* | 2/2010 | Johnson | ........................ | B60S 1/64 15/313 |
| 2016/0068141 A1* | 3/2016 | Schultz | ........................ | B60S 1/64 15/313 |
| 2016/0368461 A1* | 12/2016 | Logli, Jr. | ........................ | B60S 1/64 |
| 2017/0050622 A1* | 2/2017 | Garcia | ........................ | B60S 1/64 |

\* cited by examiner

AIR POWERED VACUUM SYSTEM

CONTINUITY

This application is a non-provisional patent application of provisional patent application No. 62/494,814, filed on Aug. 22, 2016, and priority is claimed thereto.

FIELD OF THE PRESENT INVENTION

The present invention relates to a method and device for creating a vacuum cleaning system by means of air pressure that acts upon a venturi valve, and more specifically, the present invention relates to a vacuum cleaning device configured to be disposed within the travel cabin of a motorized vehicle with stored access to pressurized air. The present invention allows a user to clean the cabin area by means of an air powered vacuum cleaner.

BACKGROUND OF THE PRESENT INVENTION

Similar to carpets and floors of homes, offices, and other structures, the interior cabin of many motor vehicles is subject to contamination by dirt and debris, which affect the aesthetic quality of the cabin of the vehicle. Conventionally, owners of these vehicles have used brushes and external vacuums to clean the dirt, leaves, and other debris out of the vehicle cabins in order to clean the floor.

Unfortunately, brushes often fail to get all of the small debris, such as sand, from a vehicle cabin, and require a dust pan to sweep the debris out of the vehicle. This process is often tedious, time consuming, and ineffective. External vacuums also present problems. Most vacuums require external power, often requiring to be plugged into AC power to function, which can present a challenge of finding a power plug near the parked vehicle. Additionally, external vacuums are often large and designed for use indoors. As such, they do not easily fit into small areas of a vehicle cabin. Use of such external vacuums systems brought into the cab effectively blocks the user's ability to move within the cramped quarters of the cabin. Battery powered vacuums presently exist on the market, but often lack the power required to effectively clean all areas of the cabin.

Some modern vehicles are equipped with an internal vacuum system to address these issues. The internal vacuum system is known to be disposed in the rear of mini-vans and sport utility vehicles to facilitate cleaning of the cabin of the vehicle by the user/owner. In such cases, the internal vacuum system is always powered by DC power from the battery system of the vehicle. Extended use of such battery-powered vacuum systems can drain the battery of the vehicle, perhaps even to the point where it does not have enough power to start the engine of the vehicle.

Presently, truck drivers are known to use standard shop hoses, connected to the pressurized air of the truck, in order to directly blow dirt out of the cabin of the truck, as the drivers presently have no other in-vehicle options available. Unfortunately, the use of the pressurized system in this capacity adds pollutants to the breathable air of the cabin, and is not an advised practice.

Thus, there is a need for an air-powered vacuum system to be integrated into vehicle cabins, especially the cabins of large trucks, buses, and recreational vehicles, to facilitate the safe and effective cleaning of the cabin of dirt and debris with suction sustained by a venturi provided via the existing air system of the vehicle. Such a device preferably mounts flush with the floor of the cabin, and internally houses a vacuum hose to be extended out of the floor to clean the cabin. Additionally, such a device preferably capitalizes on the existing air system of the vehicle to power the vacuum, such as that found on semi-trucks and similarly large vehicles, rather than drain the battery system of the vehicle. Therefore, with such a system, there is no need for electricity, extension cords or storage areas for the storing of a conventional standalone vacuum system.

Numerous innovations showing a method and device for an air vacuum system are shown in the prior art that will be described. Even though these innovations may be suitable for the specific individual purposes to which they address, they differ from the present invention. A search of the known prior art includes multiple patents that address the above stated elements and have relevance to inventions similar to that of the present invention, however no patents were found that have all the desired elements and structure.

For example, U.S. Pat. No. 5,454,139, patented by Beck and published on Oct. 3, 1995, is for a 'Vacuum cleaner for vehicles' which is similar to that of the present invention. However, the invention taught by Beck fails to teach the seamless and flush integration of the vacuum hose into the floor of the cabin of the vehicle, and is not shown to be stowed out of sight when not in use. While Beck does teach the use of a venturi to generate the suction of the vacuum, the invention lacks integration of the components of the vacuum into the floor, as well as describing the logistics of the suction. Additionally, activation of the system is not seamless, unlike the present invention, which is configured to activate automatically upon demand for use shown by the withdrawal of the vacuum hose from the cover plate. Likewise, Beck does not teach the use of the existing pressurized air system, known for use of the on-board air brakes of heavy vehicles, in order to power the vacuum. As such, the present invention is superior to that of the device taught by Beck.

SUMMARY OF THE PRESENT INVENTION

The present invention is an air powered vacuum system configured to be integrated within a motor vehicle, such as a truck, van, bus, or recreational vehicle. The present invention is designed for use within the cabin of the vehicle, which is equipped with a cover plate, preferably disposed on the floor of the cabin of the vehicle, configured to provide access to a vacuum hose in communication with a vacuum. The vacuum of the system of the present invention is preferably created via a venturi effect, created by a venturi unit disposed in communication with the existing pressurized air system of the vehicle. The vacuum hose of the present invention is configured to be disposed out of sight when not in use, housed within a front tube disposed beneath the floor of the cabin of the vehicle. When use of the present invention is required, a user simply lifts the cover plate with a finger, facilitating the extension of the vacuum hose from under the cover plate. The suction of the vacuum is initiated at the moment the user opens the cover plate via an air switch.

The flow of suction to the front pipe and vacuum hose originates at a vacuum chamber which is in communication with the existing pressurized air system of the vehicle. The venturi unit is housed within the vacuum chamber, which achieves suction due to its placement in communication with the flow of pressurized air adjacent to a pressure conduit. The vacuum chamber is equipped with a chamber top and a chamber bottom. The chamber bottom is configured to be easily removed by the user to facilitate removal of collected dust and debris which collects within a dirt receptacle after use of the present invention. A pipe system channels the suction to the vacuum hose under the floor of the cabin from the vacuum chamber. As such, it is envisioned that the vacuum hose of the present invention may be used to effectively clean the floors and sides of the cabin, as well as to clean out bedding, chairs, dashboards, closets, and other storage areas conventionally found in trucks and other large vehicles.

It should be noted that the implementation and use of the present invention requires no moving parts, with the exception of the mechanical air switch (valve) used to activate/deactivate the flow of suction to the vacuum hose of the present invention. As such, the present invention does not present a fire hazard, as it requires no electrical source or mechanical friction in order to operate.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
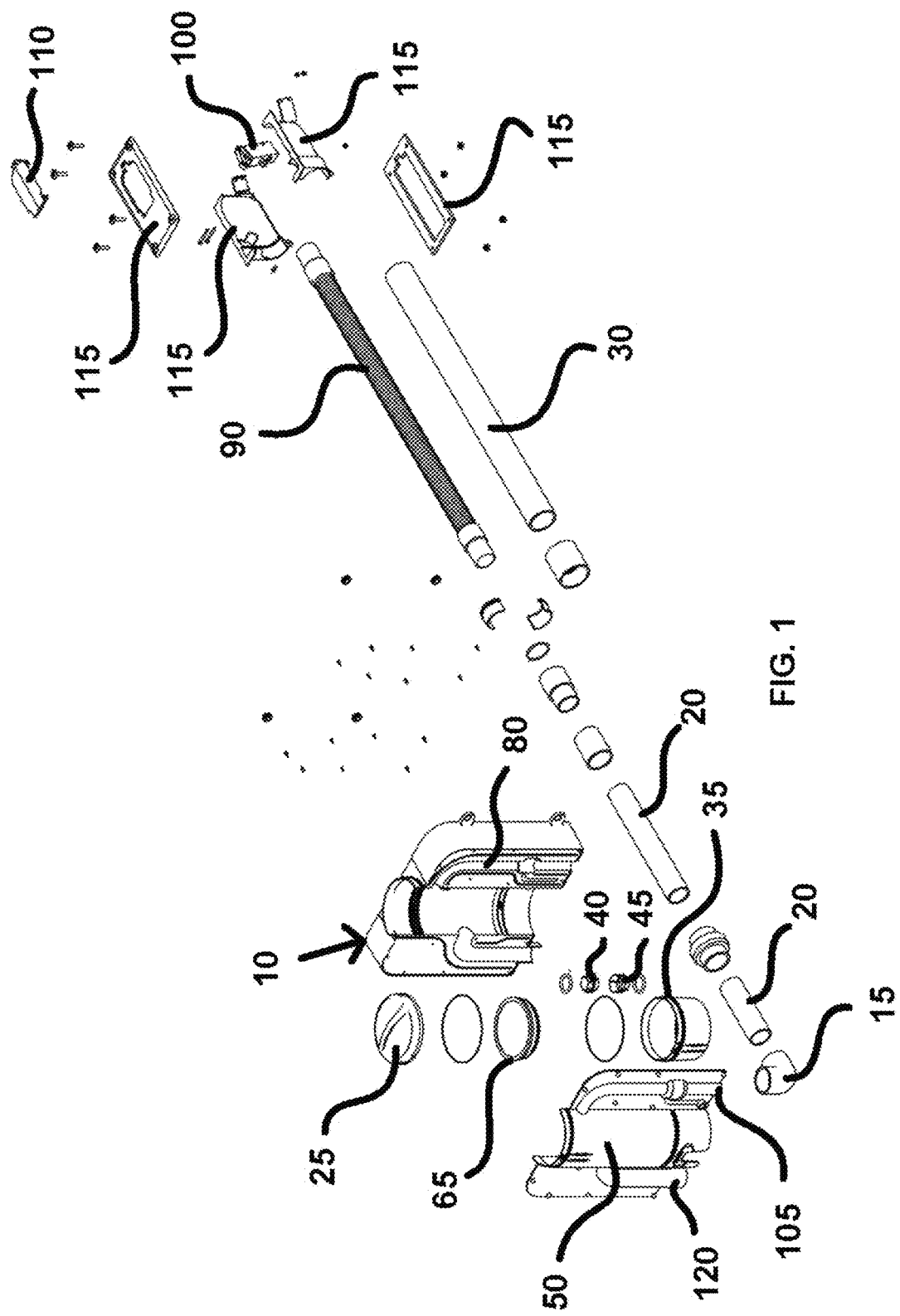
FIG. 1 depicts an exploded view of the components of the present invention.
Figure 2:
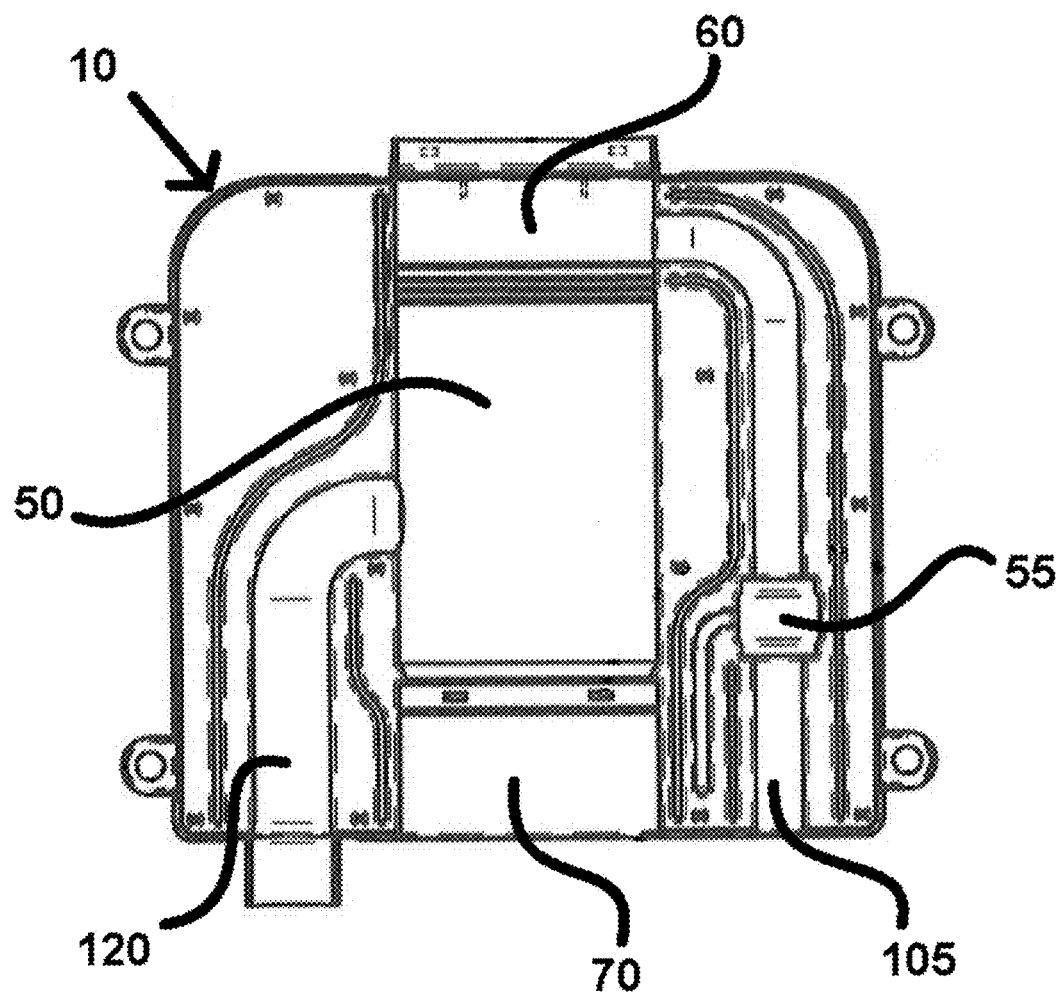
FIG. 2 shows the vacuum unit, including the vacuum chamber housing of the present invention as seen from the rear, relative to its preferred placement at the back of the cabin of the vehicle.
Figure 3:
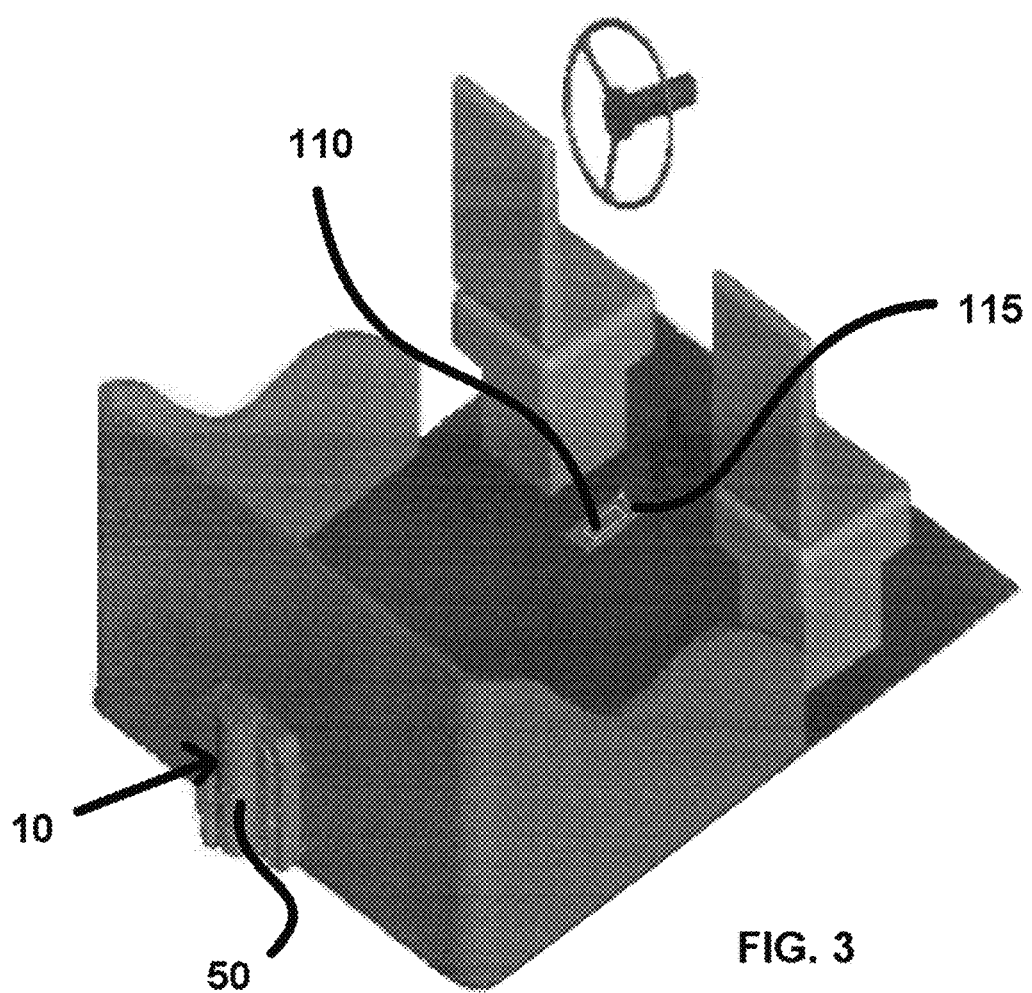
FIG. 3 exhibits a view of the front pipe and cabin components of the present invention as viewed from the side.
Figure 4:
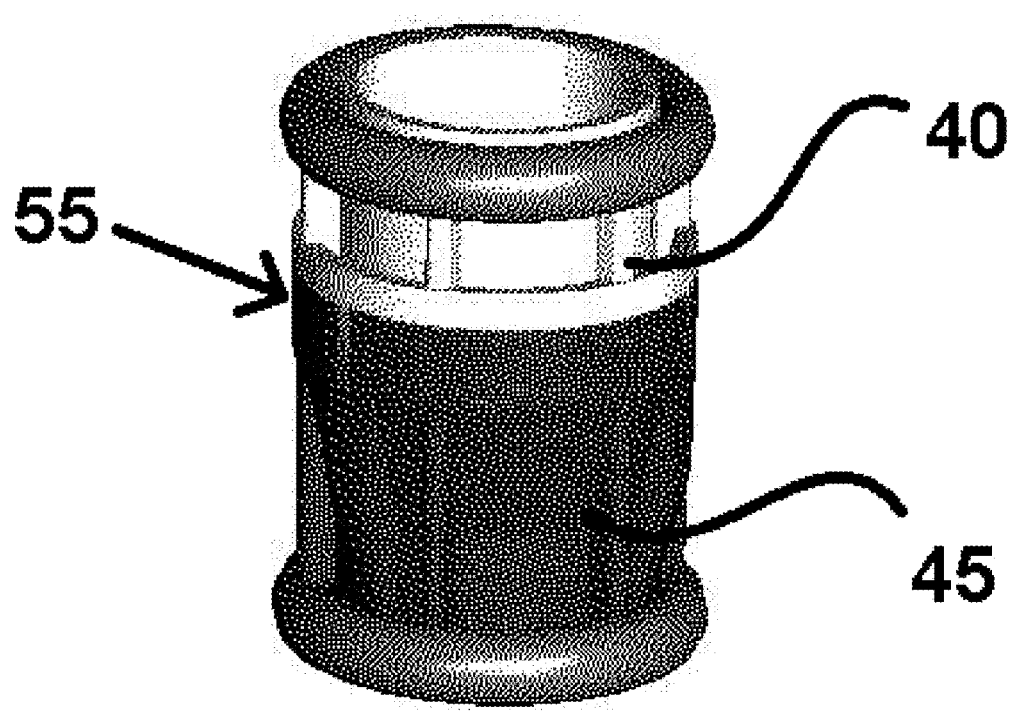
FIG. 4 details the venturi of the present invention as shown from the front.
Figure 5:
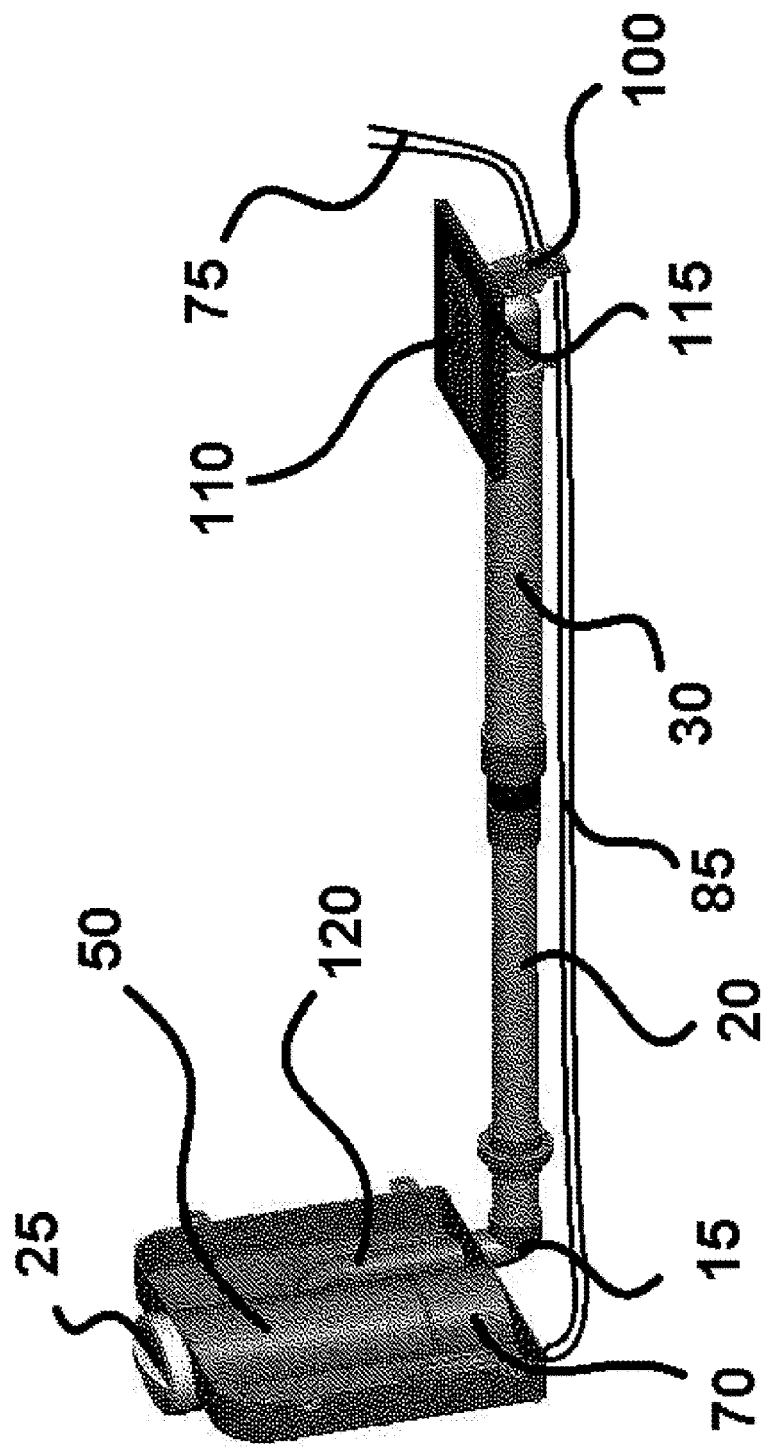
FIG. 5 shows the entire system of the present invention assembled, but not installed in a vehicle.

The present invention is a vehicle-integrated, air-powered vacuum system configured for use by a user to clean a cabin area of a vehicle, such as a truck, van, bus, or recreational vehicle (RV), etc. The present invention employs an air-powered suction device (vacuum unit) (10), that is mounted on a planar surface, outside of the cabin of the vehicle. The vacuum unit (10) is in direct communication with a piping system 20, and terminates at a cover plate (110) which is preferably mounted on the floor of the cabin of the vehicle within a cover plate housing (115). Vacuum suction is generated by means of a venturi (55), which is mounted within the vacuum unit (10). The venturi (55) is composed of a venturi top (40) and a venturi bottom (45).

The vacuum unit (10) of the present invention includes a vacuum chamber (50), that is capped on the top by a chamber top (25), and on the bottom by a chamber bottom (70). This vacuum chamber (50) is pressure evacuated by means of a pressure conduit 80, which is in direct communication with a venturi (55). The suction generated by the venturi is then communicated to the cover plate (110), which also contains the vacuum hose (90) housed within front pipe (30), which is then available for vacuum cleaning the interior of the cab. An air filter (65) is preferably present within the vacuum chamber (50), and is configured to filter the air of contaminants. Pressurized air configured to supply the venturi (55) is provided by the existing pressurized air system of the vehicle, and is supplied via air hoses. A first air hose (75) conveys pressurized air to the air switch (100). When the switch is closed by the user's motion of opening the cover plate (110), the pressurized air travels to the vacuum passageway (105) via a second air hose (85) to supply the venturi (55), and create the vacuum.

During use, debris collects within the internal vacuum chamber (50), which can then be removed by dislodging the chamber bottom (70) and discarding collected debris via a dirt receptacle (35). The system of the present invention is activated automatically by means of an air switch (100), which activates the flow of suction when the cover plate (110) within the cabin of the vehicle is opened. The present invention is configured to shut down when the cover plate (110) is closed, deactivating the air switch (100).

Figure 6:
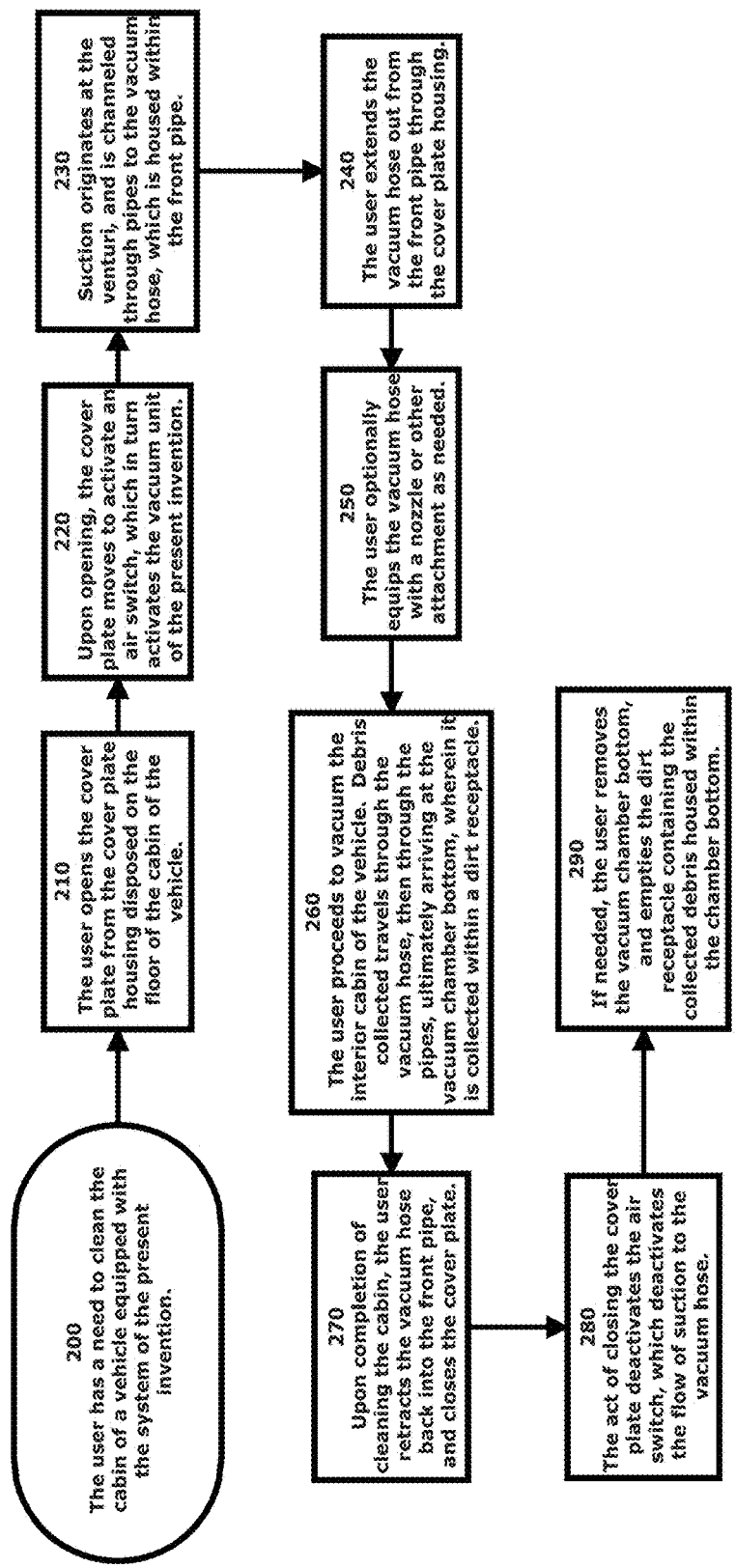
FIG. 6 shows a flow chart detailing the preferred process of use of the present invention.

The process of use of the present invention, as depicted in FIG. 6, is preferably as follows:

1. The user has a need to clean the cabin of a vehicle equipped with the system of the present invention. (200)
2. The user opens the cover plate (110) from the cover plate housing (115) disposed on the floor of the cabin of the vehicle. (210)
3. Upon opening, the cover plate (110) moves to activate an air switch (100), which in turn activates the vacuum unit (10) of the present invention. (220)
4. Suction originates at the venturi (55), and is channeled through pipes (20) to the vacuum hose (90) housed within the front pipe (30). (230)
5. The user extends the vacuum hose (90) out from the front pipe (30) through the cover plate housing (115). (240)
6. The user optionally equips the vacuum hose (90) with a nozzle or other attachment as needed. (250)
7. The user proceeds to vacuum the interior cabin of the vehicle. Debris collected travels through the vacuum hose (90), then through the pipes (20), ultimately arriving at the vacuum chamber bottom (70), wherein it is collected within a dirt receptacle (35). (260) A vacuum intake (120) opposite the vacuum passageway (105) allows the flow of air into the vacuum chamber to supply the venturi (55).
8. Upon completion of cleaning the cabin, the user retracts the vacuum hose (90) back into the front pipe (30), and closes the cover plate (110). (270)
9. The act of closing the cover plate (110) deactivates the air switch (100), which deactivates the flow of suction to the vacuum hose (90). (280)
10. If needed, the user removes the vacuum chamber bottom (70), and empties the dirt receptacle (35) containing the collected debris housed within the chamber bottom (70). (290)

An additional listing of the assorted components of the system of the present invention is provided as shown in FIG. 1-5. As such, it should be understood that the present invention is not limited in scope to the following components:

Air powered suction device (vacuum unit) (10)
Elbow joint (15)
Pipes (20)
Top cap (25)
Front pipe (30)
Dirt receptacle (35)
Venturi top (40)
Venturi bottom (45)
Venturi unit (55)
Vacuum chamber (50)
Chamber top (60)
Filter (65) (HEPA™)
Chamber bottom (70)

First air hose (75)
Pressure conduit (80)
Second air hose (85)
Vacuum hose (90)
Air switch (100)
Vacuum passageway (105) (exhaust)
Cover plate (110)
Cover plate housing (115)
Vacuum intake (120)

It should be understood that the air switch (100) of the present invention is in communication with the pressurized air system of the vehicle via a conventional compressed air hose, namely the first air hose (75) and the second air hose (85). The second air hose (85) preferably connects to the vacuum passageway (105) via a conventional air intake fitting. Additionally, some embodiments of the present invention are preferably equipped with a second air intake fitting in communication with the vacuum chamber (50), which enables a user to employ the system of the present invention by plugging in an external air supply. Such a second intake fitting provides for the present invention to be used indefinitely, even while the vehicle not in use, and the air of the existing onboard air system has lost pressure.

In addition, the vacuum system of the present invention can be used when the vehicle is not running (with the engine turned off). As brief use of the present invention to clean the cabin may take under five minutes, the pressurized air stored within the air brake system compressors can supply enough pressurized air required to use the present invention for brief periods of time without the need to run the engine of the vehicle.

It should also be understood that the pipes (20) employed within the present invention are air-tight, so as to facilitate a creation of a stable vacuum via the venturi (55) and vacuum chamber (50). Additionally, the air switch (100) of the present invention is preferably a conventional pneumatic air switch, which is in communication with a spring-loaded air valve. When the air switch (100) is activated, the spring loaded button of the air valve is pressed down, allowing the pressurized air from the air brake system (or other pressurized air system) of the vehicle to flow through the system of the present invention. When the cover plate (110) is closed, the spring-loaded button of the air valve of the air switch (100) seals, causing pressurized air to stop flowing through the system.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. An air powered vacuum system for use within a vehicle equipped with a pressurized air system comprising:
    a vacuum chamber, said vacuum chamber disposed within a vacuum chamber housing;
    a vacuum intake, said vacuum intake in communication with said vacuum chamber;
    a vacuum passageway, said vacuum passageway in communication with said vacuum chamber;
    a venturi, said venturi disposed within said vacuum passageway;
    wherein said venturi is in communication with the pressurized air system of the vehicle, creating a vacuum;
    air-tight piping, said air-tight piping extending from said vacuum passageway to beneath a cabin of the vehicle;
    a vacuum hose, said vacuum hose disposed within said air-tight piping;
    a cover plate, said cover plate mounted within a cover plate housing;
    wherein said cover plate housing is disposed on a floor of said cabin of the vehicle;
    wherein said air-tight piping terminates at said cover plate housing;
    an air switch, said air switch configured to direct air flow from the pressurized air system of the vehicle to create suction via said venturi upon opening said cover plate; and
    wherein said cover plate facilitates access to said vacuum hose from within said cabin when said cover plate is open.

2. The system of claim 1, further comprising:
    a filter, said filter disposed within said vacuum chamber; and
    wherein said filter is a HEPA filter.

3. The system of claim 2, further comprising:
    a dirt receptacle, said dirt receptacle disposed at a bottom of said vacuum chamber;
    wherein dirt collected via vacuum suction is stored within said dirt receptacle; and
    wherein said dirt receptacle is configured to be removed from said vacuum chamber to remove collected debris from said vacuum chamber.

4. The system of claim 1, further comprising:
    a dirt receptacle, said dirt receptacle disposed at a bottom of said vacuum chamber;
    wherein dirt collected via vacuum suction is stored within said dirt receptacle; and
    wherein said dirt receptacle is configured to be removed from said vacuum chamber to remove collected debris from said vacuum chamber.

5. The system of claim 1, further comprising:
    an elbow joint, said elbow joint disposed between said vacuum passageway and said air-tight piping; and
    wherein said elbow joint directs the flow of suction toward the cabin of the vehicle.

6. The system of claim 1, wherein said air-tight piping is disposed such that it is accessible to facilitate the removal of a clog.

7. An air powered vacuum system for use within a vehicle equipped with a pressurized air brake system comprising:
    a vacuum chamber, said vacuum chamber disposed within a vacuum chamber housing;
    a vacuum intake, said vacuum intake in communication with said vacuum chamber;
    a vacuum passageway, said vacuum passageway in communication with said vacuum chamber;
    a venturi, said venturi disposed within said vacuum passageway;

wherein said venturi is in communication with the pressurized air brake system of the vehicle, creating a vacuum;
air-tight piping, said air-tight piping extending from said vacuum passageway to beneath a cabin of the vehicle;
a vacuum hose, said vacuum hose disposed within said air-tight piping;
a cover plate, said cover plate mounted within a cover plate housing;
wherein said cover plate housing is disposed on a floor of said cabin of the vehicle;
wherein said air-tight piping terminates at said cover plate housing;
an air switch, said air switch configured to permit air to flow from the pressurized air brake system of the vehicle to said vacuum chamber create suction via said venturi upon opening said cover plate;
a first air hose, said first air hose in communication with the pressurized air brake system and said air switch;
a second air hose, said second air hose in communication with said air switch and said vacuum chamber via a vacuum passageway; and
wherein said cover plate facilitates access to said vacuum hose from within said cabin when said cover plate is open.

* * * * *